United States Patent [19]
Ledford et al.

[11] 3,986,428
[45] Oct. 19, 1976

[54] LOCK RING FOR SHACKLE PINS AND THE LIKE

[75] Inventors: John E. Ledford; Leonard L. Hierath, both of Denver, Colo.

[73] Assignee: John E. Ledford, Denver, Colo.

[22] Filed: May 29, 1975

[21] Appl. No.: 581,741

[52] U.S. Cl. .................................................. 85/8.3
[51] Int. Cl.² .......................................... F16B 19/00
[58] Field of Search ............ 85/8.3, 5 CP, 8.1, 5 N; 403/49; 70/458; 24/3 K

[56] References Cited
UNITED STATES PATENTS

| | | | |
|---|---|---|---|
| 1,055,515 | 3/1913 | Carroll | 85/50 R |
| 1,799,934 | 4/1931 | Strid | 85/8.3 |
| 3,695,140 | 10/1972 | Noble | 85/8.3 |

FOREIGN PATENTS OR APPLICATIONS

| | | | |
|---|---|---|---|
| 1,348,440 | 12/1963 | France | 85/8.3 |
| 865,078 | 1/1953 | Germany | 85/8.1 |

*Primary Examiner*—Ramon S. Britts
*Assistant Examiner*—Rodney H. Bonck
*Attorney, Agent, or Firm*—Reilly and Hancock

[57] ABSTRACT

A releasable locking ring has a full circular portion defined by a split, coiled ring having a free, tapered overlapping end and an opposite end bent into a generally semi-circular bail portion curving substantially in a plane normal, or slightly less than normal, to that of the ring; and the bail terminates in a curved return at its free extremity adjacent to the ring.

8 Claims, 5 Drawing Figures

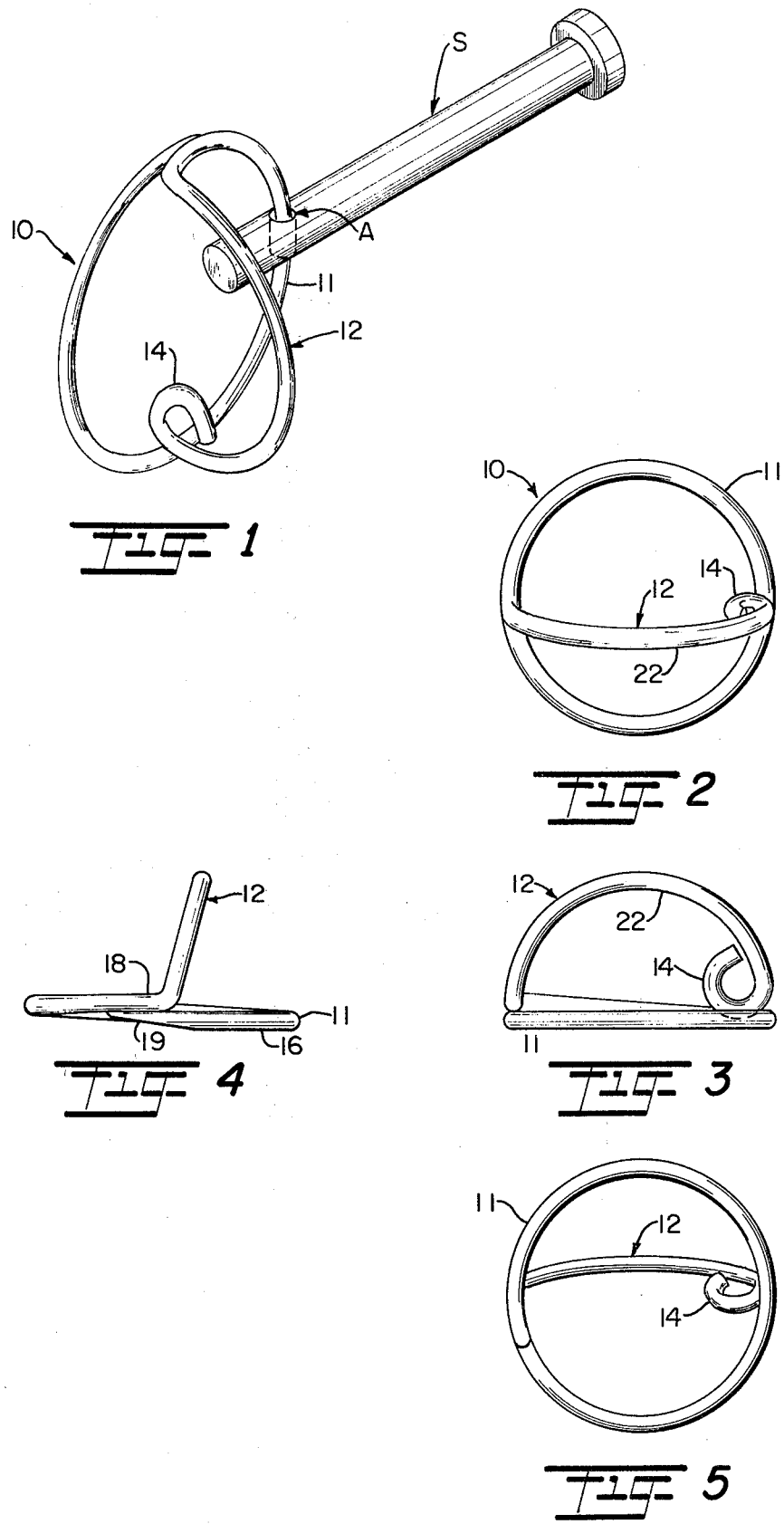

LOCK RING FOR SHACKLE PINS AND THE LIKE

This invention relates to releasable locking devices, and more particularly relates to a novel and improved releasable wire-like locking ring adaptable for releasable insertion into the bore on a shaft or shank portion, such as for instance, shackle pins or clevis pins used in releasably locking or detachably coupling other members together.

BACKGROUND OF THE INVENTION

Various types of keepers or fasteners have been devised for detachable connection to one or more other members to prevent their accidental release, or in locking or coupling another member onto a third member. For example, cotter pins are often utilized on the free end of a rod or bolt to detachably connect other members together. In addition, split rings have been employed to releasably connect other members together by separating a free end of the ring and passing it through an aperture in each member and advancing until the member clears the opposite end. Typically, split rings are utilized as key rings but have been utilized in other applications as a detachable means of interconnection for various objects. In the past, however, cotter pins, split rings and similar types of spring or wire-like locking elements while insuring against accidental release have been difficult to manipulate both in locking and release thus making them very impractical and unsuitable for many applications.

SUMMARY OF THE INVENTION

It is therefore an object of the present invention to provide for a novel and improved locking device for detachable connection to another member in a positive manner so as not to be subject to accidental release.

It is another object of the present invention to provide a wire-locking ring adapted for detachable connection to a bolt, rod, shank, shaft or the like which can be easily manipulated with the use of one hand both for locking and release.

It is a further object of the invention to provide a split ring locking member with a bail forming a unitary part of the ring to facilitate opening or expansion of the ring both in locking and release with respect to another member.

In accordance with the present invention, a locking member has been devised which includes a split ring provided with a tapered end which serves as the leading end for insertion through the aperture of another member. The opposite end of the ring has an extension in the form of a semi-circular bail extending diametrically across the ring and terminates in a free end which has a curved return contiguous to the body of the ring. Preferably the ring has a single turn or coil with the tapered end overlapping the other end so that the ring can be easily spread by hooking one finger through the bail and pressing the ring with another finger or thumb on the same hand to spring the tapered end away from the ring for insertion into a bore or aperture on the member or members to be locked. Thereafter, the ring is advanced through the aperture past the return segment on the bail whereupon the ring and bail can be released to permit the tapered end to return under spring force to its original closed disposition. Once released the locking device will securely retain the member to be locked in position both by virtue of the bail and overlapping end of the ring with the bail limiting movement of the member to prevent its slipping off of the tapered end. Preferably, the bail extends in a plane other than precisely normal to the ring so that the user can more readily ascertain the direction of movement of the locked member for release from the ring as well as to facilitate grasping of the bail both in locking and release and has an easily discernible reference feature which enables one to determine at a glance whether or not the ring is fully locked.

Other objects, advantages and features of the present invention will become more readily apparent in view of the following detailed description taken in conjunction with the accompanying drawings, in which:

DETAILED DESCRIPTION OF THE DRAWINGS

FIG. 1 is a perspective view of a preferred form of locking ring illustrating installation of the ring onto another locking member.

FIG. 2 is a plan view of the preferred form of locking ring in accordance with the present invention.

FIG. 3 is an elevational view of the preferred form of locking ring.

FIG. 4 is another elevational view of the preferred form of locking ring at right angles to FIG. 3; and FIG. 5 is a bottom plan view of the preferred form of locking ring in accordance with the present invention.

DETAILED DESCRIPTION OF THE PREFERRED EMBODIMENT

Referring in detail to the drawings, there is shown in FIGS. 1 to 5 a preferred form of locking ring 10 broadly comprised of a split, coiled ring 11 and a bail 12 having a return segment 14.

The ring portion 11 is of generally circular configuration and preferably made up of a single coil of spring steel wire or other resilient material having a free tapered end 16 overlapping the opposite end 18 and normally biased in a closed position against the surface of the ring with the tapered or beveled surface 19 on the side of the end portion 16 opposite to its point of contact with the ring surface. In the alternative, the end surface 19 may be scarf-cut or rounded to a full radius, if desired.

The bail 12 preferably defines a unitary extension of the ring and is preferably formed by bending away from the upper or opposite end 18 in a direction to extend in a plane nearly normal to the plane of the ring portion. As shown in FIG. 4 the bail is bent at an angle less than 90° to the ring portion and is made up of a generally semi-circular portion 22 which extends diametrically across the ring and terminates in the curved return segment 14 contiguous to, or touching, the surface of the ring for a purpose to be described.

Thus the locking member as described can be constructed of a single length of resilient wire of circular cross-section bent in the manner described to form the ring 11 and bail 12, and the portions 11 and 12 are capable of undergoing spreading or expansion either independently of one another or simultaneously about the bending point at the end 18 between the bail 12 and ring 11.

FIG. 1 illustrates the intended manner of placement of the locking ring 10 on another member, such as, a shackle pin S having an aperture A, which pin is typically used in the releasable interconnection of sailboat rigging. In order to lock the pin S in position, the pin is first inserted through the member to be locked or coupled, not shown, until the free end of the pin S and its aperture A are exposed. The locking ring 10 is held in one hand with one finger engaging the bail and another finger pressing against the ring portion 11 adjacent to the free end 16 to pry them apart so that the free end has sufficient clearance for insertion into the aperture A. In a continuous operation or movement the ring portion 11 is twisted or rotated until the end or external surface of the pin S passes the return segment 14 whereupon the bail 12 and ring portion 11 can be released to permit the free end 16 and return segment 19 to spring or snap back into their normally closed positions. In the closed position, the ring 10 is locked against accidental release both by the bail 12 and ring portion 11, since the bail 12 will discourage any return movement of the pin S past the return segment 14 toward the free end 16. If the pin should accidentally move past the return segment 14 toward the free end 16, the bent portion at the opposite end 18 will prevent continued movement along the free end. With the bail 12 bent to an angle less than 90° the return segment 14 will be inclined in a direction tending to resist accidental movement of the pin S in the release direction and enable the user to more easily hook his finger through the bail 12 in spreading it apart from the ring 11. The curved return segment 14 serves as a more effective stop than a straight portion as well as to minimize accidental catching or snagging of the free end of the bail on another object; and of course is safer to use without danger of scratching or cutting. The same is true of the tapered end 19 on the ring portion 11.

It will be evident that the bail may be made closer to a precise normal relationship to the ring; also, that it may be other than semi-circular or arcuate. In either case, it would not be as effective in use. In addition, the ring 11 may consist of more than one coil in which case it could not afford the same ease of positive locking and release with one hand. Furthermore, the locking ring is conformable for use in any number of different applications in addition to those described or alluded to in the foregoing and may be sized according to such different applications.

Although the present invention has been described with a certain degree of particularity, it is understood that the present disclosure has been made by way of example and that changes in details of structure may be made without departing from the spirit thereof as defined by the appended claims.

What is claimed is:

1. A locking ring adaptable for releasable locking engagement with another member wherein the other member is provided with a ring-receiving opening therein, said locking ring comprising:

a split, coiled ring having a generally circular body portion terminating at one end in a free end portion at least partially overlapping and normally contiguous to the full circular body portion of said ring, and a handle means in the form of a curved bail extending from said body portion in a direction curving diametrically across said circular body portion in a plane substantially normal to the plane of said ring portion and terminating in a free end closely adjacent to the surface of said body portion diametrically opposite to its point of extension away from said body portion.

2. A locking ring according to claim 1, said bail being of generally semi-circular configuration.

3. A locking ring according to claim 2, the free end of said bail terminating in a curved return contiguous to the surface of said body portion, all points of said return laying in the plane of said bail substantially normal to said ring portion.

4. A locking ring according to claim 1, the free end of said body portion extending in overlapping relation to the other end of said body portion on a side of said body portion opposite to the direction of extension of said bail away from said body portion.

5. A locking ring adaptable for releasable locking engagement with a bolt member and the like in which said bolt member is provided with a ring-receiving aperture therein, said locking ring comprising:

a split, coiled ring composed of resilient material terminating at one end in a free, tapered overlapping end portion and having a bail at its opposite end, said bail being bent at a substantial angle to the plane of said ring portion to curve diametrically across said ring portion, and said bail terminating in a curved return segment of limited length defining a substantially closed loop closely adjacent to a portion of said ring portion diametrically opposite to the bent terminal end portion of said ring.

6. A locking ring according to claim 5, said bail being of generally semi-circular configuration and being curved in a plane at an acute angle to the plane of said ring portion.

7. A locking ring according to claim 5, said ring having a body portion in which the free tapered end extends beyond the bent terminal end portion.

8. A locking ring according to claim 5, said locking ring assembly being comprised of a single piece of wire bent to define a one-piece ring portion and bail as hereinbefore defined said return segment being bent in the plane of said bail substantially 90° to the plane of said ring portion.

* * * * *